UNITED STATES PATENT OFFICE.

BERNARD F. DRAKENFELD, JR., OF NEW YORK, N. Y.

GLASS AND METHOD OF MAKING THE SAME.

1,303,269.     Specification of Letters Patent.     Patented May 13, 1919.

No Drawing.     Application filed October 1, 1918. Serial No. 256,374.

*To all whom it may concern:*

Be it known that I, BERNARD F. DRAKENFELD, Jr., a citizen of the United States, residing at 103 East 86th St., New York city, in the county of New York and State of New York, have invented certain new and useful Improvements in Glass and Methods of Making Same, of which the following is a specification.

This invention relates to improvements in the method of manufacturing glass, the object of the invention being to provide an improved method of making glass whereby the strength, temper and appearance of the glass will be materially improved. The improvements have to do with the manufacture of soda, potash or lead glasses in which the principal alkali is soda or potash or both, although the invention is not necessarily confined to glasses of these particular characters.

This improved method consists in adding to the basic glass batch a certain proportion of lithia and aluminum-bearing minerals, such as spodumene. For instance, to a soda glass batch, wherein the principal alkali is soda, I add a certain proportion of spodumene or a similar mineral containing lithia and aluminum.

Spodumene is a mineral largely found in South Dakota, California and other parts of the country and is of the nature of a lithium-aluminum metasilicate, the chemical formula for the same approximating $LiAl(SiO_3)_2$, the equivalent of silica 64.5% alumina 27.4% and lithia 8.4%.

In practice, to a basic batch, for instance for making jars, bottles, window or plate glass or other inexpensive glass, I add from one to five per cent., more or less of spodumene to the entire weight of the batch, which addition has the effect of substantially increasing the strength and temper of the glass.

In some cases I may fuse the spodumene separately or mix it with soda or lime and other chemicals and then bail out the fused material and afterward add it to the regular batch.

In certain cases, as for instance the making of special glasses, I add up to fifty per cent. of the spodumene, but in all instances it is found that the addition of spodumene to the batch very materially improves the strength and temper of the glass.

The addition of spodumene in suitable proportions to glass batches, primarily by reason of the lithia content, reduces the coefficient of expansion and thereby renders the finished glass more stable when subjected to high heat, that is, more resistant to heat.

The term "glass" as herein used is intended to cover any vitreous body, such as vitreous enamels and all classes of pottery glazes and such analogous materials, since enamels and glazes are forms of glass and are very effectively made by the addition of spodumene thereto.

It is understood of course that I do not confine myself to the exact proportions herein specified as such proportions are given as examples of what has been found to be desirable ones in the manufacture of this improved glass.

In the making of jars, bottles, window or plate glass or other inexpensive glass or for the making of crystal or pressed glass where soda is the principal alkali, the batch to which the spodumene is added usually consists of the well known materials, such as sand, soda and lime in the proportions well known in the art, and in the making of special glasses, such as containing boracic acid, in which instance the batch is itself largely composed of spodumene in the proportions hereinbefore referred to, the batch consists of sand and soda or potash or both with or without lime, and therefore as these several batches from which glass is usually made are well known, a more detailed description thereof is unnecessary and therefore the term "batch" as used in the claims is intended to cover any of the mixtures of raw materials well known in the art.

The use of spodumene in the manufacture of glass not only toughens and strengthens the glass but it decreases the viscosity of the molten glass, so that the flowing qualities thereof are increased.

I claim as my invention:

1. The method of making glass, which consists in adding to an unfused batch of glass making materials the mineral spodumene, and then fusing the mixture.

2. The method of making glass, which consists in adding to an unfused batch of glass making materials the mineral spodumene in a fused condition, and then fusing the mixture.

3. The method of making glass, which consists in adding to an unfused batch of glass making materials a proportion not substantially exceeding fifty per cent. of lithia and aluminum bearing minerals and then fusing the mixture.

4. The method of making glass, which consists in adding to an unfused batch of glass making materials a proportion not substantially exceeding fifty per cent. of lithia and aluminum bearing materials in a fused condition, and then fusing the mixture.

5. The method of making glass, which consists in adding a quantity of spodumene to a glass batch, and then fusing the batch thereby to produce a glass in which the strength, temper and appearance thereof is materially improved.

6. The method of making glass, which consists in adding up to fifty per cent. of spodumene to a glass batch, and then fusing the batch.

7. The method of making inexpensive glass, which consists in adding to a glass batch from about one to five per cent. of spodumene, and then fusing the batch.

8. The method of making soda glass, which consists in adding to a glass batch a quantity not substantially exceeding fifty per cent. of spodumene, and then fusing the batch.

9. The method of making specially formed glass or glass containing boracic acid, which consists in adding to a glass batch from one to fifty per cent. of spodumene, and then fusing the batch.

10. The method of making glass, which consists in first fusing spodumene separately, and then adding it to a batch of glass.

11. The method of making glass, which consists in first fusing spodumene separately, and then adding to a batch of glass a quantity thereof not exceeding fifty per cent. of the weight of the batch of glass.

12. The method of making glass, which consists in fusing spodumene with glass-producing materials, then bailing the fused glass, and then subsequently adding this fused material to a glass batch.

13. The method of making glass, which consists in first fusing spodumene with a glass making material, and then adding the so fused material to a glass batch.

14. The method of making glass, which consists in first fusing spodumene with an alkaline material then bailing out the fused material, and then adding the so fused material to a glass batch.

15. As an article of manufacture, glass containing fused spodumene.

Signed at New York city, New York, this thirtieth day of September, 1918.

BERNARD F. DRAKENFELD, Jr.